United States Patent

Bowater

(10) Patent No.: US 6,942,253 B2
(45) Date of Patent: Sep. 13, 2005

(54) LOCATOR TAB AND ASSOCIATED HOSE CLAMP

(75) Inventor: Bruce D. Bowater, Jacksonville, FL (US)

(73) Assignee: Epicor Industries, Inc., Denver, CO (US)

(*) Notice: Subject to any disclaimer, the term of this patent is extended or adjusted under 35 U.S.C. 154(b) by 23 days.

(21) Appl. No.: 10/418,482

(22) Filed: Apr. 18, 2003

(65) Prior Publication Data

US 2004/0207195 A1 Oct. 21, 2004

(51) Int. Cl.$^7$ ................................................. F16L 55/00
(52) U.S. Cl. ........................ 285/23; 285/252; 285/420; 29/890.14
(58) Field of Search .......................... 285/23, 252, 253, 285/420; 138/109; 29/464, 890.14

(56) References Cited

U.S. PATENT DOCUMENTS

| | | | | |
|---|---|---|---|---|
| 3,365,218 A | | 1/1968 | Denyes ........................ 285/253 |
| 3,389,442 A | * | 6/1968 | Tetzlaff ....................... 285/252 |
| 3,407,448 A | | 10/1968 | Tetzlaff ........................... 24/19 |
| 3,407,449 A | | 10/1968 | Tetzlaff ........................... 24/19 |
| 3,477,106 A | | 11/1969 | Tetzlaff ......................... 24/279 |
| 4,135,744 A | * | 1/1979 | Fouts ........................... 285/253 |
| 4,312,525 A | | 1/1982 | Kleykamp ................... 285/236 |
| 4,592,575 A | * | 6/1986 | Hughes et al. .............. 285/252 |
| 6,116,657 A | | 9/2000 | Oetiker ......................... 285/23 |
| 6,390,136 B1 | | 5/2002 | Hutchins et al. ............ 138/109 |
| 6,530,609 B1 | | 3/2003 | Chatterton ................... 285/420 |

OTHER PUBLICATIONS

Drawing (redacted) dated Nov. 1, 2000 of Ideal Division/Stant Corp. (Applicant) prior art commercialized worm drive clamp.

* cited by examiner

Primary Examiner—David Bochna
(74) Attorney, Agent, or Firm—C. H. Castleman; S. G. Austin; J. A. Thurnau

(57) ABSTRACT

An improved locator and hose clamp configuration that is able to statically position a hose clamp in close proximity to the end of a hose, and resist substantial pull off loads. The improved hose clamp locator comprises a connection portion, a head portion, a deflecting portion having a reduced bending resistance positioned between the connection and head portion, an end portion extending angularly from the head portion, a clip portion extending angularly from the end portion, and a tooth portion disposed to engage an interior surface of a hose extending angularly from the clip portion. Also provided is an improved hose clamp assembly comprising a band provided with a partial aperture, an adjustor disposed to facilitate constriction of the band, and a clamp locator connected to the band and positioned adjacent the partial aperture. Additionally, a method of clamping a hose to a fitting comprising the steps of attaching a clamp locator being disposed to deflect under hose clamp operations to a hose clamp having a band describing a partial aperture, positioning the hose clamp around a hose, forcing the clamp locator to engage the hose, positioning the hose clamp and hose around a fitting, and tightening the hose clamp and allowing the clamp locator to deflect towards the partial aperture described by the hose clamp band.

13 Claims, 2 Drawing Sheets

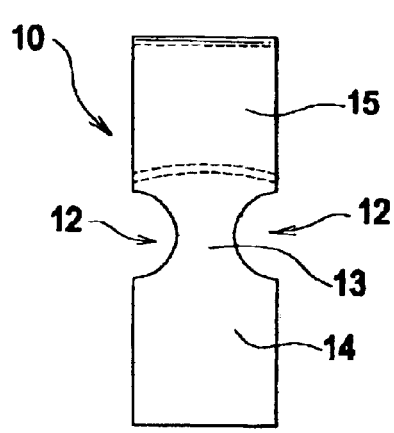
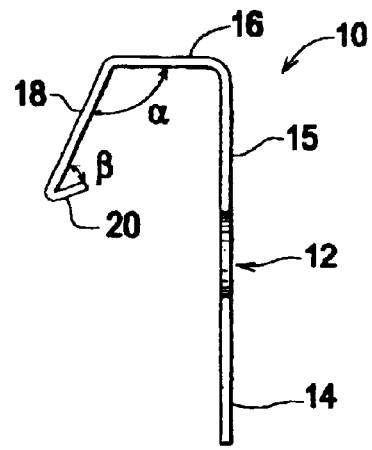
FIG.1
FIG.2
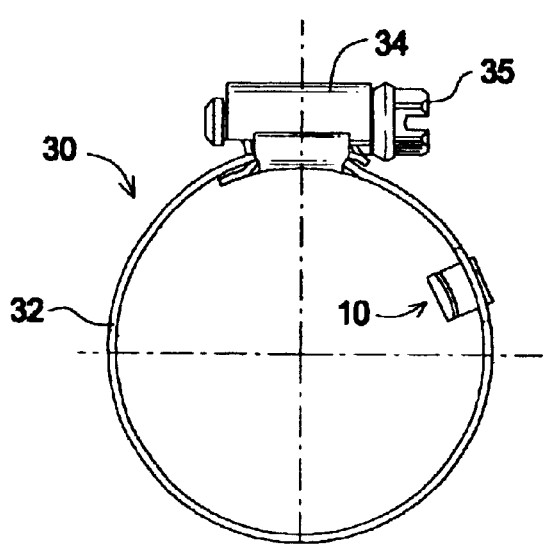
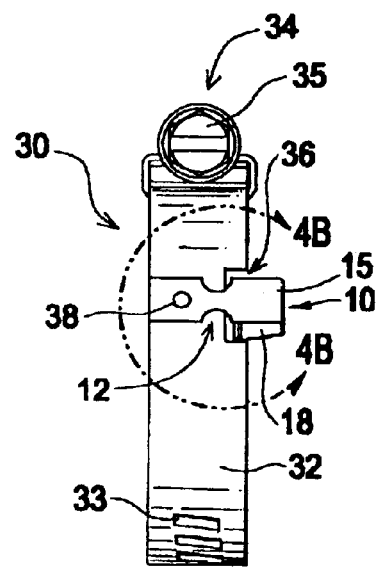
FIG.3
FIG.4
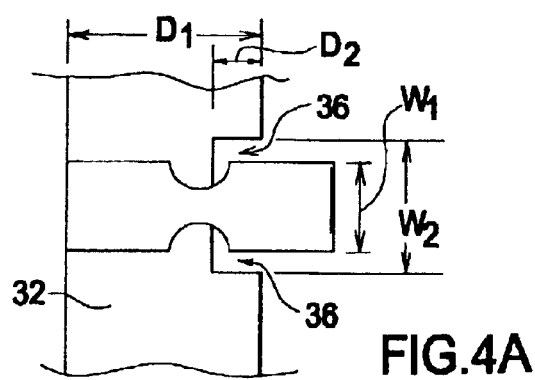
FIG.4A

LOCATOR TAB AND ASSOCIATED HOSE CLAMP

TECHNICAL FIELD

This invention relates to the field of hose clamp assemblies, more particularly, this invention relates to a locator tab that is associated with a hose clamp assembly, and allows the hose clamp to be positioned in close proximity to the end of a hose.

BACKGROUND OF THE INVENTION

Hose clamps are commonly utilized to join hoses and fittings or connectors (referred to hereinafter as fittings) together, especially within the automotive industry. With the increasing demands for efficiency within the manufacturing/installation process, manufacturers have requested that parts be delivered already partially assembled. With respect to hose clamp assemblies, this translates to having the hose clamps located on and around a hose a given distance from its end and at a predetermined radial orientation, prior to their delivery for installation. In this manner, an assembler does not have to rotate or longitudinally move the clamp around to a different position to effect tightening of the clamp and completion of installation. Several methods have been utilized to attach and locate hose clamps for one or more of these purposes. Examples of locators that are used in conjunction with clamps include: spring liners that circumscribe a hose and constrict it to maintain its position; adhesive for attaching the clamp to the hose at the prescribed location; plastic retainers that "tie" around a hose; a rubber "patch" which has been positioned over the band and then vulcanized; and various clip configurations that attach to the clamp and around the end of a hose, very similar to a paper clip.

In a further desire for design and material usage efficiencies, it has been proposed to position a hose clamp in close proximity to the end of the hose, sometimes as close as 4 mm or less from the end. This close positioning further requires the locator to be able to resist random handling forces that would tend to misalign or detach the located clamp. The industry refers to this as resistance to "pull-off". At such a close proximity to the end of a hose, the rigidity of the hose is substantially lower, thereby creating problems with locators that rely on such rigidity, as the hose tends to "cave in" when exposed to an inward radial pressure, such as from spring liners and plastic retainers. The use of adhesive to locate a clamp in such situations has also proven unsatisfactory for many reasons, including the lack of sufficient surface area to provide an adequate bond. Additionally, adjusting the length of standard clip configurations has created problems in that the rigidity of the clips has conflicted with and prevented the clamps from achieving adequate sealing. As the clamp has been tightened in such configurations, the rigidity and length of the locator clip has actually interfered with the clamp itself. This has caused the locator to undesirably deflect the clamp outwardly and separate the hose from the fitting. There is a need for a modified locator and clamp that is able to statically position a hose clamp in a predetermined radial orientation, and in close proximity to the end of a hose, and resist substantial pull-off loads.

SUMMARY OF THE INVENTION

Accordingly, it is an aspect of the present invention to provide an improved locator and clamp configuration that is able to statically position a hose clamp in a predetermined radial orientation, and in close proximity to the end of a hose, and resist substantial pull off loads. The improved hose clamp locator comprises a connection portion, a head portion, a deflecting portion having a reduced bending resistance positioned between the connection and head portion, an end portion extending angularly from the head portion, a clip portion extending angularly from the end portion, and a tooth portion disposed to engage an interior surface of a hose extending angularly from the clip portion.

It is another aspect of the present invention to provide an improved hose clamp assembly comprising a band provided with a partial aperture, an adjustor disposed to facilitate constriction of the band, and a clamp locator connected to the band and positioned adjacent the partial aperture.

Still another aspect of the present invention is to provide a method of clamping a hose to a fitting comprising the steps of attaching a clamp locator being disposed to deflect under hose clamp operations to a hose clamp having a band describing a partial aperture, positioning the hose clamp around a hose, forcing the clamp locator to engage the hose, positioning the hose clamp and hose around a fitting, and tightening the hose clamp and allowing the clamp locator to deflect towards the partial aperture described by the hose clamp band.

The above and other features and advantages of the invention will be apparent from the following detailed description.

BRIEF DESCRIPTION OF THE DRAWINGS

FIG. 1 is a plan view of a clamp locator in accordance with the present invention;

FIG. 2 is a side view of the clamp locator of FIG. 1;

FIG. 3 is a side view of a clamp locator and associated hose clamp in accordance with the present invention;

FIG. 4 is an end view of the clamp locator and associated hose clamp of FIG. 3;

FIG. 4A is a magnified view of the clamp locator and associated hose clamp of FIG. 4 taken at 4A—4A;

DISCLOSURE OF THE PREFERRED EMBODIMENTS OF THE INVENTION

Figure 5A:
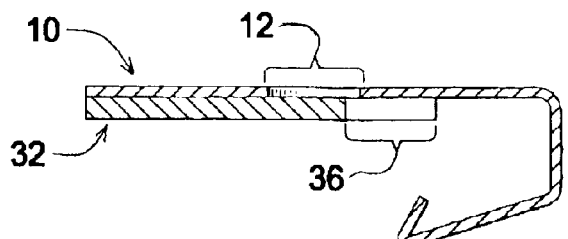
FIG. 5A is a sectional partial view of a clamp locator and the band of the associated hose clamp in accordance with the present invention.

Referring to FIG. 1, a clamp locator (shown generally at 10) is comprised of a connection portion 14, deflecting portion 13, and head portion 15. Connection portion 14 is disposed to be connectable to a hose clamp, so it is preferable that it is substantially planar or slightly rounded to match the radial shape of the hose clamp. The deflecting portion 13 is located between the connection portion 14 and head portion 15, and may be generally shaped by partial apertures 12. The deflecting portion 13 shall have a generally reduced bending resistance compared to the head portion 15, in order to facilitate deflection under hose tightening operations, as is discussed in more detail below.

The partial apertures 12 illustrated in FIG. 1 are shown as two semi-circle cutouts located at the edges. The purpose of the apertures is to sufficiently degrade the rigidity of the overall clamp locator 10 to allow it to deflect under loads caused by the tightening of an associated hose clamp, as will be described in more detail below, and to have that deflection occur in the region of the deflecting portion 13. Through the utilization of partial apertures 12, the deflecting portion 13 has a reduced bending resistance compared to the head portion 15. As such, the partial apertures may take on numerous configurations, including, but certainly not limited to, a single partial aperture; more than two partial apertures located adjacent to each other on each side; a single aperture in the middle of the deflecting portion 13; a configuration of smaller apertures or slots stretching from one side to the other; or any combination of two or more of the foregoing. It is further contemplated that use of apertures or partial apertures may not be required if the clamp locator 10, and particularly the deflecting portion 13, is comprised of a sufficiently malleable material, or has a constriction in its width or reduction in its thickness, which allows deflection under typical tightening loads as applied to tighten an associated hose clamp. It should be noted that known clamp locators, typically formed from stainless steel, do not sufficiently deflect under typical tightening loads without at least one partial aperture. However, it is contemplated that use of locator tab comprising a sufficiently malleable material, or a constriction in its width or reduction in its thickness, may provide adequate deflecting properties to negate the need for partial apertures.

Referring to FIG. 2, additional elements of clamp locator 10 become apparent. An end portion 16 extends angularly from the head portion 15, preferably at a substantially perpendicular angle, and is sufficiently long enough to enable the clamp locator 10 to be positioned on the end of the associated hose. Extending from the end portion 16 at angle a is a clip portion 18. It is preferable that angle a is a slightly obtuse angle so that the clamp locator may be easily positioned on the end of the applicable hose. An angle a of between about 100° to about 130°, more preferably about 114°, has been found to work adequately, although any angle a greater than 90° but less than 155° is contemplated. Then extending from the end of the clip portion 18 at angle β is a tooth portion 20. The tooth portion 20 is disposed to engage an interior surface of a hose, and therefore may have the same width as the rest of the clamp locator 10, or may be configured to narrow along its length to thereby form a sharper engagement point. Additionally, the tooth portion 20 preferably extends from the clip portion at an acute angle β, to act as a barb once in contact with a hose, and keep the clamp locator in position. It is contemplated that angle β can be between about 20° and about 100°, where an angle β between about 30° and about 60° is more preferred, and an angle β of about 45° is most preferred. As will be discussed in more detail below, the head portion 15, end portion 16, clip portion 18, and tooth portion 20 work cooperatively to statically position the clamp locator relative to the end of a hose.

FIG. 3 illustrates a hose clamp (shown generally at 30) in conjunction with a clamp locator 10. Hose clamp 30 is a typical hose clamp well known in the art in that it is comprised of a circumferential band 32 and an adjustor 34. Adjustor 34 is illustrated as a worm drive adjustor, having a worm gear meshable with inclined perforations 33 and rotated by rotating integral head 35 with a suitable tool in a known manner, although any common hose clamp adjustor may be used. The clamp locator 10 may be positioned at any desired radial point along the band 32, however it is preferable to position it where it will not interfere with adjustment operations. FIG. 4 is an end view of the hose clamp 30. The connection portion 14 of the clamp locator 10 is attached to the band 32 at point 38. It is contemplated that the connecting portion 14 may be attached to band 32 by any means that provides an adequate bond, such as, but not limited to, heat welding, chemical welding, chemical bonding, staking, use of mechanical fasteners, or a combination of two or more of the foregoing.

It is further contemplated that the clamp locator 10 may be positioned in a predetermined manner to band 32 to effect a desired positioning of the overall clamp assembly 30 relative to an associated hose. In this manner, it is possible to position the clamp locator 10 at a specific angle point along band 32 so that during installation, an installer may merely align the clamp locator 10 with a predetermined point on the associated hose. This would provide for a consistent positioning of the clamp adjustor 34 relative to the hose, which in turn creates efficiencies in the installation process. Additionally, in applications with limited clearance, such as the engine compartment of some vehicles, the clamp adjustor 34 may be specifically positioned in order to assure access to the clamp adjustor 34 for tightening and later maintenance operations. As such, the clamp locator 10 may be utilized to both locate a hose clamp 30 a specific distance from the end of a hose, as well as at a specific angle of rotation relative to the hose.

The band 32 may additionally have a partial aperture 36 that works cooperatively with a clamp locator 10 in allowing the hose and locator to deflect towards the band without conflicting with the restrictive sealing process of the clamp, as discussed in more detail below. The partial aperture 36 may take any size and shape, but should not be significant enough in size to degrade the tensile properties of band 32 and prevent proper sealing functions. Additionally, the partial aperture 36 is preferably wide enough to allow the clip portion 18 of clamp locator 10 to pass through as it is being deflected, as well as a portion of the hose pressed in between the head portion 15 and clip portion 18 that is being deflected as well. It is important to note that it is not required that the clip portion 18 actually deflect through the partial aperture 36 for the assembly to work properly, but it is preferred only that it be able to. For the foregoing reasons and referring to FIG. 4A, it has been found that for a typical application, a ratio of partial aperture depth $D_2$ to band depth $D_1$ of from about 1:6 to about 1:2 is desirable, more preferably a ratio from about 1:5 to about 1:3, and most preferably a ratio of about 1:4. Additionally, a ratio of clamp locator width $W_1$ to partial aperture width $W_2$ of about 1:1.2 to about 1:2.5 is contemplated, where a ratio from about 1:1.3 to about 1:1.8 is more preferred, and a ratio from about 1:1.4 to about 1:1.6 is most preferred. It is also preferable to have the clamp locator 10 centrally located with respect to the partial aperture 36 of band 32. This depth ratio allows the band 32 to tighten sufficiently and seal associated hoses without significant deflection from the remaining depth of the band 32. And the width ratio allows proper deflection of an associated hose to be conducive to proper sealing.

Figure 5B:
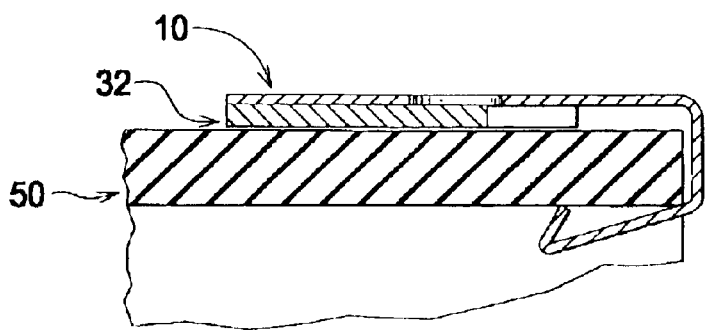
FIG. 5B is a sectional partial view of the clamp locator and the band of the associated hose clamp of FIG. 5A positioned on a hose in accordance with the present invention.
Figure 5C:
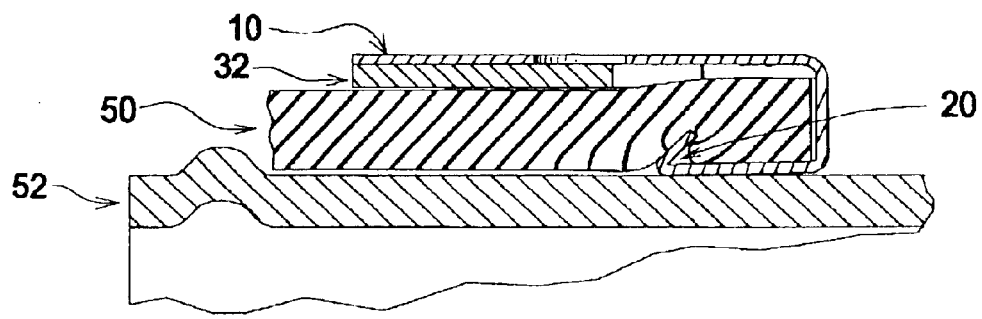
FIG. 5C is a sectional partial view of the clamp locator and the band of the associated hose clamp secured on a hose and further mounted on a fitting in accordance with the present invention.

FIGS. 5A–5D represent a typical assembly process incorporating the present invention. FIG. 5A is a sectional view of a clamp locator 10 having a partial aperture 12, and attached band 32 having a partial aperture 36. In FIG. 5B, the assembly is positioned over the end of a hose 50, which is shown in partial cutaway for clarity. In FIG. 5C, the clamp locator 10 has been clamped into position on the hose 50, so that the tooth portion 20 compresses and "grabs" a portion of the hose 50. It is contemplated that this clamping can be performed by the use of a machine, simple tools such as a pair of pliers, or even by hand for some limited applications. The angle of the tooth portion 20 relative the belt 50 prevents the clamp locator 10 from easily being pulled off. The hose 50 can then be positioned over a fitting 52, for which clamping of the two components together is desired. Again, the term fitting refers to fittings and connectors, as well as any other auxiliary part to which it may be desired to clamp a hose.

Figure 5D:
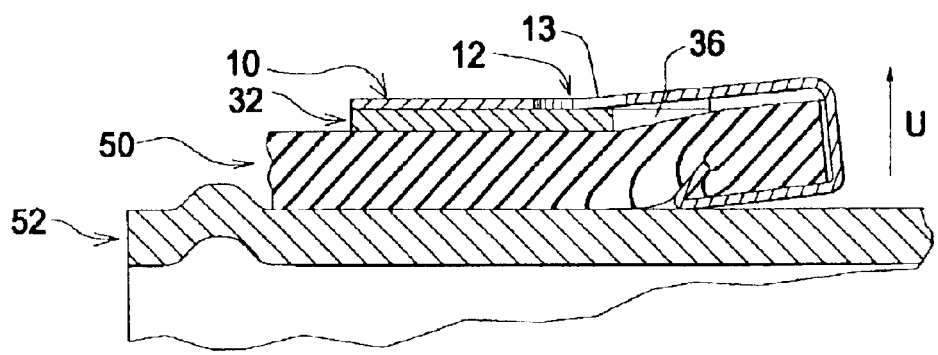
FIG. 5D is a sectional partial view of the clamp locator and the band of the associated hose clamp secured on a hose and fitting according to FIG. 5C after the hose clamp has been tightened in accordance with the present invention.

After the hose 50 is placed in proper position relative the fitting 52 in order to be sealed, the clamp may then be tightened. FIG. 5D illustrates the deflection that occurs during tightening operations of the clamp. As the clamp band 32 moves radially inward during the clamp tightening process, the portion of the hose 50 under the band 32 compresses while the portion of the hose 50 contained by the clamp locator 10 is not compressed or compresses only an insignificant amount, whereby the positioning of the clamp locator 10 relative to the fitting 52 creates an upward force in direction U. As the deflecting portion 13 of the clamp band 32 is inherently weaker due to the presence of the partial aperture 12, bending of the clamp locator will occur in the deflecting portion 13. As is also apparent from FIG. 5D, the presence of a partial aperture 36 in band 32 allows a portion of the hose 50 to deflect through, thereby allowing the remainder of the hose 50 to create a seal with the fitting 52. The modified band 32 and the clamp locator 10 work in concert together to allow placement of a hose clamp in close proximal end of a hose, while maintaining a proper seal as well as preventing the hose clamp from being pulled off easily.

Although a specific preferred embodiment has been described with reference to the accompanying drawings herein, it is to be understood that the invention is not limited to that precise embodiment, and that various changes and modifications may be effected by one skilled in the art without departing from the scope or spirit of the invention as defined in the appended claims. Moreover, the invention illustratively described herein may be practiced in the absence of any element that is not specifically disclosed herein.

What is claimed is:

1. A hose clamp locator for positioning an adjustable hose clamp at the end of a hose, said clamp locator comprising:
   a connection portion disposed to facilitate connection to a hose clamp;
   a head portion;
   a deflecting portion positioned between said connection portion and said head portion, said deflecting portion having a reduced bending resistance compared to said head portion and disposed to deflect upon tightening of said adjustable hose clamp;
   an end portion extending angularly from said head portion;
   a clip portion extending angularly from said end portion; and
   a tooth portion extending angularly from said clip portion so that said tooth portion is disposed to engage an interior surface of a hose.

2. The clamp locator of claim 1, wherein said deflecting portion describes at least one partial aperture.

3. The clamp locator of claim 1, wherein said deflecting portion describes at least one aperture.

4. The clamp locator of claim 1, wherein said clip portion extends from said end portion at an angle of between about 100° and about 130°.

5. The clamp locator of claim 1, wherein said tooth portion extends from said clip portion at an angle of between about 30° and 60°.

6. The clamp locator of claim 1, wherein said end portion extends from said head portion at substantially perpendicular angle.

7. An adjustable hose clamp assembly comprising:
   a band with an edge thereof describing a partial aperture;
   an adjustor disposed to facilitate constriction of said band;
   a clamp locator connected to said band and positioned adjacent to said partial aperture, said clamp locator disposed to engage a hose and position said band around said hose.

8. The hose clamp assembly of claim 7, wherein said clamp locator comprises:
   a connection portion disposed to connect to said band;
   a head portion;
   a deflecting portion positioned between said connection portion and said head portion, said deflecting portion having a reduced bending resistance compared to said head portion and disposed to deflect upon tightening of said adjustable hose clamp;
   an end portion extending substantially perpendicular from said head portion;
   a clip portion extending an obtuse angle from said end portion; and
   a tooth portion extending an acute angle from said clip portion, said tooth portion being disposed to engage an interior surface of a hose.

9. The hose clamp assembly of claim 8, wherein said deflecting portion of said clamp locator describes at least one partial aperture.

10. The hose clamp assembly of claim 7, further comprising:
    a hose, wherein said clamp locator is engaged with said hose, and said band is positioned around said hose.

11. The hose clamp assembly of claim 7, wherein the ratio of the width of said clamp locator to the width of said partial aperture provided by said band is from about 1:1.4 to about 1:1.6.

12. The hose clamp assembly of claim 7, wherein the ratio of the depth of said partial aperture provided by said band to the depth of said band is from about 1:3 to about 1:5.

13. A method of clamping a hose to a fitting, said method comprising the steps of:
    attaching a clamp locator to a hose clamp, said clamp locator being disposed to deflect under hose clamp tightening operations, said hose clamp having a circumferential band describing a partial aperture on an edge thereof;
    positioning said hose clamp around a hose;
    forcing said clamp locator to engage said hose to statically position said hose clamp relative to said hose;
    positioning said hose clamp and said hose around a fitting; and
    tightening said hose clamp and allowing said clamp locator to deflect towards said partial aperture described by said band of said hose clamp.

* * * * *